US008640203B2

(12) United States Patent
Shakkarwar

(10) Patent No.: US 8,640,203 B2
(45) Date of Patent: Jan. 28, 2014

(54) METHODS AND SYSTEMS FOR THE AUTHENTICATION OF A USER

(76) Inventor: Rajesh G. Shakkarwar, Saratoga, CA (US)

( * ) Notice: Subject to any disclaimer, the term of this patent is extended or adjusted under 35 U.S.C. 154(b) by 1022 days.

(21) Appl. No.: 12/132,268

(22) Filed: Jun. 3, 2008

(65) Prior Publication Data
US 2008/0298588 A1 Dec. 4, 2008

Related U.S. Application Data

(60) Provisional application No. 60/941,876, filed on Jun. 4, 2007.

(51) Int. Cl.
G06F 7/04 (2006.01)
G06F 15/16 (2006.01)
G06F 17/30 (2006.01)
G06F 21/00 (2013.01)
G06F 11/30 (2006.01)
G06F 12/14 (2006.01)
H04L 29/06 (2006.01)

(52) U.S. Cl.
USPC .................. 726/4; 726/10; 713/183; 713/193

(58) Field of Classification Search
USPC .................................. 713/183, 193; 726/4, 10
See application file for complete search history.

(56) References Cited

U.S. PATENT DOCUMENTS

| 8,010,679 | B2 * | 8/2011 | Low et al. ...................... 709/227 |
| 2003/0182558 | A1 | 9/2003 | Lazzaro et al. |
| 2003/0217288 | A1 | 11/2003 | Guo et al. |
| 2004/0143791 | A1 | 7/2004 | Ito et al. |
| 2004/0255137 | A1 * | 12/2004 | Ying .............................. 713/193 |
| 2006/0161970 | A1 * | 7/2006 | Hopen et al. ....................... 726/4 |
| 2007/0022416 | A1 * | 1/2007 | Masuda .......................... 717/151 |
| 2007/0204127 | A1 * | 8/2007 | Lin et al. ........................ 711/170 |

OTHER PUBLICATIONS

International Search Report. Oct. 7, 2008.

* cited by examiner

Primary Examiner — Kambiz Zand
Assistant Examiner — Benjamin Kaplan
(74) Attorney, Agent, or Firm — Patterson & Sheridan, LLP

(57) ABSTRACT

The present invention generally relates to a computer security system for use in the identification and authentication of a user. In one aspect, a method for identifying and authenticating a user is provided. The method includes establishing a trust between a server machine and an agent on a user machine. The method further includes establishing a session key to encrypt communications between the server machine and the agent. The method also includes receiving a username and password for use in validating the user. Additionally, the method includes creating an executable binary for the extraction of device data from the user machine to uniquely identify the machine. In another aspect, a computer-readable medium including a set of instructions that when executed by a processor causes the processor to identify and authenticate the user is provided. In a further aspect, a system for identifying and authenticating a user is provided.

36 Claims, 3 Drawing Sheets

METHODS AND SYSTEMS FOR THE AUTHENTICATION OF A USER

CROSS-REFERENCE TO RELATED APPLICATIONS

This application claims benefit of U.S. provisional patent application Ser. No. 60/941,876, filed Jun. 4, 2007, which is herein incorporated by reference.

BACKGROUND OF THE INVENTION

1. Field of the Invention

The present invention generally relates to computer security and more specifically to methods and systems for the authentication of a user.

2. Description of the Related Art

Internet commerce has increased dramatically over the last several years. As a result, several different on-line payment methods have been created. In one payment method, the buyer simply types a credit card number into an on-line payment webpage to pay for the goods or services provided by an on-line merchant. In another payment method, the buyer uses an on-line payment service to pay for the goods or services provided by an on-line merchant. The on-line payment service allows the buyer to pay the on-line merchant via the Internet using funds that are available in a bank account or on a credit card. The on-line payment service holds the account information, not the on-line merchant, and therefore the on-line payment service may protect the buyer from unlawful use of the buyer's account.

Even though on-line payment services are effective in providing a more secure means of on-line payment between the buyer and the on-line merchant as compared to paying by a credit card number or a personal check, on-line payment services typically require a single factor of authentication to verify that the buyer is actually the owner of the account. For example, the on-line payment service may require the buyer to input an email address and a password to make an on-line payment. However, the single factor of authentication, such as the email address and password, can be easily stolen by a computer hacker. This may result in the unlawful use of the buyer's account, which is a common form of identity theft.

In addition to Internet commerce, many banks now offer on-line banking which allows customers to access their accounts via the Internet. On-line banking allows a customer to perform routine transactions, such as account transfers, balance inquiries, bill payments, and stop-payment requests from a remote computer. In addition, some banks allow their customers to apply for loans and credit cards on-line as well. Similar to on-line payment services, to access the account information or apply for a loan or a credit card on-line, a bank usually requires only one factor of authentication to verify that an on-line customer is actually the owner of the account. For example, the bank may require the customer to input a username and a password to access the account. Again, the single factor of authentication, such as the username and password, can be easily stolen by a computer hacker, which may result in the unlawful use of the customer's account.

As the foregoing illustrates, there is a need in the art for a way to verify the identities of on-line customers that is more secure than current approaches.

SUMMARY OF THE INVENTION

The present invention generally relates to a computer security system for use in the identification and authentication of a user. In one aspect, a method for identifying and authenticating a user is provided. The method includes establishing a trust between a server machine and a security agent on a user machine. The method further includes establishing a session key to encrypt communications between the server machine and the agent. The method also includes receiving a username and password for use in validating the user. Additionally, the method includes creating an executable binary for the extraction of device data from the user machine to uniquely identify the machine.

In another aspect, a computer-readable medium, including a set of instructions that when executed by a processor causes the processor to identify and authenticate the user, is provided. The processor performs the step of establishing a trust between a server machine and an agent on a user machine. The processor further performs the step of establishing a session key to encrypt communication between the server machine and the agent. The processor also performs the step of receiving a username and password for use in validating the user. Additionally, the processor performs the step of creating an executable binary for the extraction of device data from the user machine to uniquely identify the machine.

In a further aspect, a system for identifying and authenticating a user is provided. The system includes a server machine having a processor and a memory, wherein the memory includes a program configured to establish a trust between the server machine and a security agent. The program is also configured to establish a session key with the security agent to encrypt communication between the server machine and the security agent. The program is further configured to receive a username and password for use in validating the user. Additionally, the program is configured to create and transmit to the security agent an executable binary for the extraction of device data. The system further includes a computing device having a processor and a memory wherein the memory includes a security agent program configured to collect a username and password and transmit the username and password to the server machine. The security agent is further configured to execute the executable binary to extract device data from the computing device to uniquely identify the computing device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope for the invention may admit to other equally effective embodiments.

DETAILED DESCRIPTION

In general, the invention relates to a computer security system for use in the authentication of a user prior to an on-line access transaction. The system will be described herein in relation to a single user. However, it should be understood that the systems and methods described herein may be employed with any number of users without departing from the principles of the present invention. The description of the invention is separated into three sections: the architecture, the registration process, and the authentication process. To better understand the novelty of the system of the present invention and the methods of use thereof reference is hereafter made to the accompanying drawings.

Architecture

Figure 1:
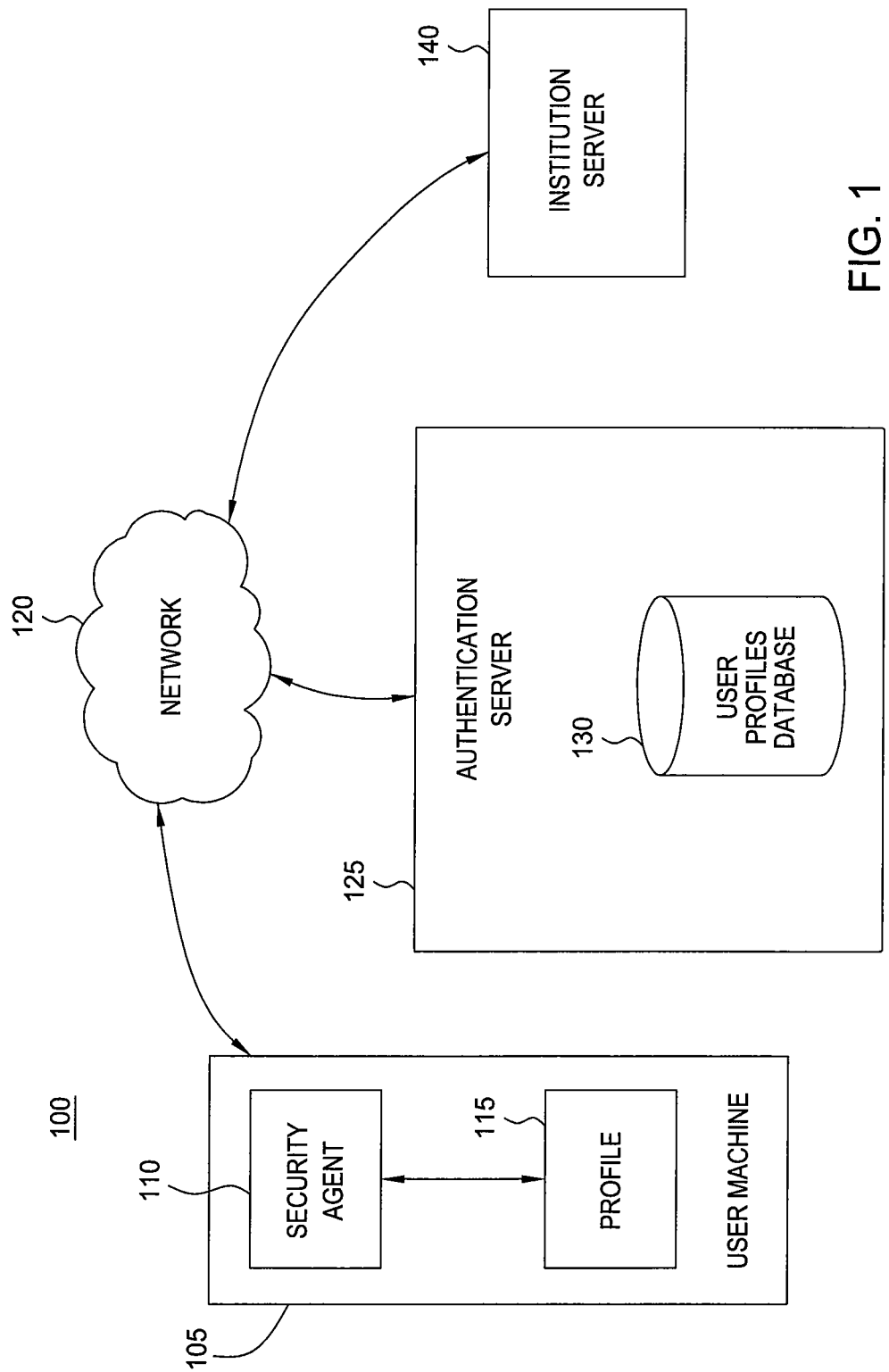
FIG. 1 is a conceptual block diagram of a system configured to authenticate the identity of a user, according to one embodiment of the invention.

FIG. 1 is a conceptual block diagram of a system 100 configured to authenticate the identity of a user, according to one embodiment of the invention. The system 100 includes a user machine 105, which may be any type of individual computing device such as, for example, a desk-top computer, a lap-top computer, a hand-held phone device, or a personal digital assistant. Generally, the user machine 105 is configured to be a communication link between the user and the other components in the system 100. The user machine 105 includes a security agent 110. Generally, the security agent 110 is a software entity that runs on the user machine 105. As described in further detail herein, the security agent 110, among other things, is configured to create an identity profile 115 of a user, collect certain data from the user machine 105 based on instructions from the authentication server 125, or manage an on-line access transaction made from user machine 105. The on-line access transaction may be any type of on-line transaction, such as an on-line payment transaction, an on-line banking transaction, a secure access transaction or any services rendered by on-line access. Additionally, the security agent 110 is designed to offer protection against various forms of computer "hacking" such as phishing, pharming, Trojan worms, key logging and the like. For instance, in one embodiment, the keypad parameters on a keypad of the security agent 110, such as the size, the location, and/or the coordinates of the keypad are randomly changed in order to offer protection against key logging. The random change in the parameters of the keypad substantially prevents a computer hacker from key logging the input data of the user. In another embodiment, the coordinates of the pressed keys are transmitted by the security agent 110 rather than the key values. In a further embodiment, the executable code for the keypad operation is transmitted to the agent 110 at the time of authentication rather than being resident on the user machine 105.

As also shown, the user machine 105 includes the profile 115, which represents the identity of the user. The profile 115 is unique for each user. As described in further detail herein, once the profile 115 has been created for the user, the identity of the user can be subsequently verified by a series of interactions between the security agent 110 and the authentication server 125 based on the profile 115. The profile 115 can be used to establish a multifactor identification for the user whenever the user attempts to conduct transactions via the user machine 105. The first factor of authentication is a username and/or password, which relates to "what the user knows." The second factor of authentication includes unique information about the user machine 105, which relates to "what the user has." The third factor of authentication includes unique information about the user, such as biometric identity, which relates to "who the user is." Although three factors are discussed herein, it should be understood that any of the factors may be an optional factor of authentication without departing from principles of the present invention.

As will be discussed below in the registration process, the username and password are created by the user and are used to validate the user in an authentication process related to the first factor authentication. As also discussed below, the username and password are transmitted in a cryptographically protected form so that accessing the actual username and password would be difficult for a snooper who may gain internal access to the user machine 105.

With respect to the second factor of authentication, the unique information about the user machine 105 generally includes a combination of select information associated with the user machine 105. The information may be static or dynamic. For instance, the information may include the International Mobile Equipment Identity (IMEI), which is a number unique to every mobile phone; the International Mobile Subscriber Identity (IMSI), which is a unique number associated with network mobile phone users; and/or the geolocation of the user machine 105, which is a real-world geographic location of a network connected computer or mobile device. The information about the user machine 105 may also include machine-level attributes. For instance, the information may include various parameters available through a PCI configuration space, like the Device ID or the Vendor ID for different system devices, the data residing in the SMM memory space, or other memory hardware attributes, such as memory type, memory clock speed, amount of memory, hard drive serial number, size of hard drive, maker of hard drive, etc., and/or chipset information or graphics card information, which can be used to read hidden and/or unhidden registers within those subsystems. Further, the information may include data at different locations in firmware or BIOS or information available in a Microcode patch or a checksum of a portion of the firmware within the user machine 105.

In addition to the foregoing, the information about the user machine 105 may also include system-level attributes. For instance, the information may include a MAC address, hard drive serial number, hardware configuration information, such as interrupt routing, GPIO routing, PCI Device Select routing, a hardware configuration map, operating system registry, CPU type, CPU version, or CPU clock speed. The information about the user machine 105 may also include system pattern extraction. For instance, the information may include a directory structure and/or a list of installed applications, such as a word processor or other computer tools.

The third factor of authentication includes unique information about the user, such as a biometric identity. For example, biometric data may include the specific typing pattern of the user since each user's typing behavior is unique. Typically, typing authentication works by requesting that a user seeking access to a computer or a password-protected file just type a short passage into the computer so that the user's typing pattern can be analyzed and matched against a known pattern. Additionally, biometric data may be generated by a biometric device, such as a fingerprint device or an iris pattern device, included within the user machine 105.

The system 100 further includes a network 120, which may be any type of data network, such as a local area network (LAN), a metropolitan area network (MAN), a wide area network (WAN), or the Internet. The network 120 is configured to act as a communication pathway between the user machine 105, the authentication server 125, and an institution server 140. The authentication server 125 stores a copy of the profile 115 generated during the registration process in a user profiles database 130. Additionally, the authentication server 125 interacts with the security agent 110 via the network 120 during the on-line access transaction, as described below. The institution server 140 stores sensitive information for the user e.g., financial account information, confidential data, etc. The institution server 140 may be part of a bank, a building society, a credit union, a stock brokerage, or any other businesses holding sensitive user/client data. Generally, the institution server 140 interacts with the security agent 110 via the network 120 during the registration process and the authentication process, as described below.

Registration Process

Figure 2:
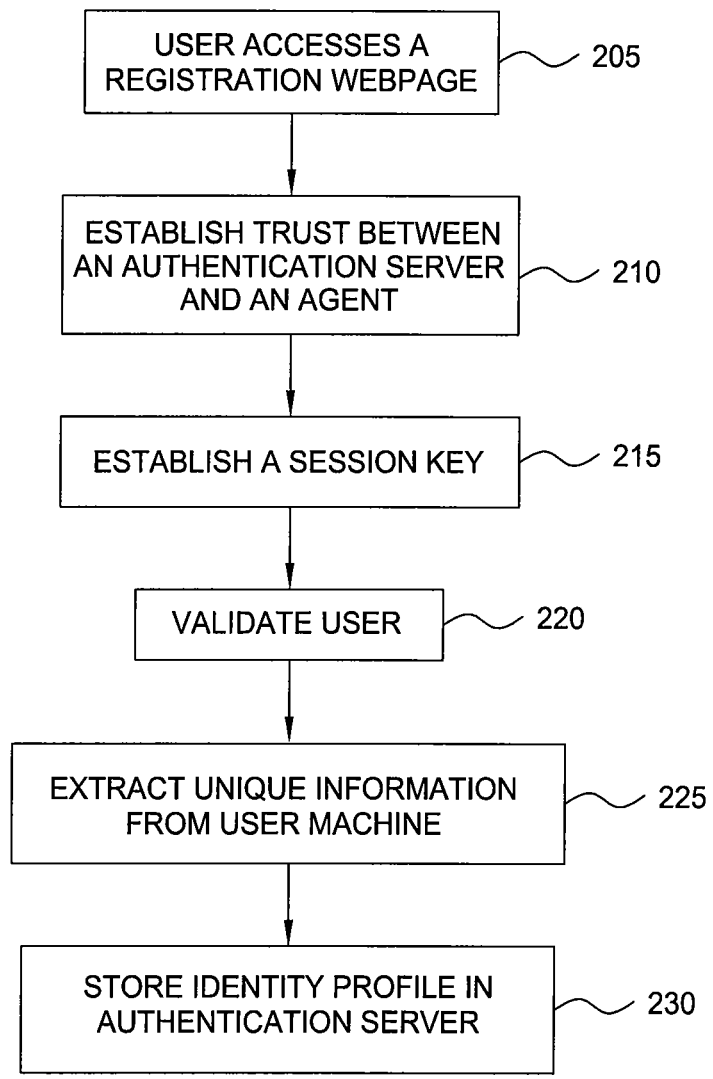
FIG. 2 is a flow chart of method steps for a registration process, according to one embodiment of the invention.

FIG. 2 is a flow chart of method steps for a registration process 200, according to one embodiment of the invention. Although the method steps are described in the context of the system of FIG. 1, any system configured to perform the method steps, in any order, is within the scope of the invention. Generally, the registration process 200 is used to establish a trust with the authentication server 125, establish a session key, validate the user, extract unique information from the user machine 105 and store the identify profile in the authentication server 125. It should be noted that the registration process is a one-time process for each user. After the registration process 200 is complete, the user is able to perform the on-line access transaction without having to repeat the registration steps.

The registration process 200 begins in step 205 when the user accesses a registration website and downloads the security agent 110 to the user machine 105. Upon a successful installation of the security agent 110 on the user machine 105, the security agent 110 is launched.

In step 210, the security agent 110 establishes a trust with the authentication server 125 in order to validate that the security agent 110 is connecting to the authentication server 125 rather than a rogue server. In this step, the security agent 110 opens a connection to the authentication server 125 and sends a number or a bit string, such as a nonce, to the authentication server 125. Generally, a nonce is a random number which is used only once as an authentication protocol to ensure that an old connection cannot be reused to establish another connection between a rogue security agent and the authentication server 125. Thereafter, the authentication server 125 digitally signs the nonce (i.e., number, or bit string) with a private key and sends the signed nonce and a public key certificate chain to the security agent 110. Subsequently, the security agent 110 verifies the certificate chain and the signed nonce. Once verified, a trust is established between the security agent 110 and the authentication server 125.

In step 215, a session key is created to ensure that the data transmitted between the security agent 110 and the authentication server 125 is encrypted. The security agent 110 initiates an agreement with the authentication server 125 to create the session key. Generally, the agreement is a cryptographic protocol that allows the security agent 110 and the authentication server 125 to jointly establish a shared secret key over an insecure communications channel. Thereafter, the authentication server 125 produces a public key agreement and then returns the agreement to the security agent 110. Subsequently, the key agreement protocol produces the session key comprising of a public key and a private key, which may be referred to as "asymmetric cryptography." The public key may be distributed, while the private key is kept secret. The data transmitted between the security agent 110 and the authentication server 125 is encrypted with the public key and can only be decrypted with the corresponding private key. In another embodiment, "symmetric cryptography" may be used to create a session key from a single secret key that is used for both encryption and decryption. Although the session key is described herein as being created by asymmetric cryptography or symmetric cryptography, any form of cryptography may be used to create the session key without departing from principles of the present invention. After the session key is created, the security agent 110 encrypts a predefined handshake (or signature) with the session key and sends the encrypted data to the authentication server 125. The handshake (or signature) informs the authentication server 125 that this is the first session for the user.

In step 220, the user is validated in order to establish the first factor of identification. In this step, the security agent 110 prompts the user to enter a username and password. In one embodiment, the security agent 110 encrypts the username and password with the session key and sends the encrypted data to the authentication server 125. Thereafter, the authentication server 125 decrypts the data to extract the username and password. The authentication server 125 then establishes a session with the institution server 140 and passes the username and password to the institution server 140 for authentication. In another embodiment, the security agent 110 establishes a session with the institution server 140 and passes the username and password to the institution server 140 for authentication. In either embodiment, it should be noted that the authentication process on the institution server 140 validates the user and thus establishes the first factor of identification. If the institution server 140 is unable to validate the user, then a message is displayed on the security agent 110 prompting the user to press a "Forgot Username/Password" button. After the button is pressed, the user is directed to the institution's password reset page. If the institution sever 140 authenticates the user, then the institution server 140 sends to the authentication server 125 an "authentication pass" message, with unique user information. The unique user information may be a username, an identity number generated by the institution server 140, a personal account number, a last name or any other type of information that uniquely identifies the user. In essence, the unique user information is a reference number for use in future transactions between the authentication server 125 and the institution server 140 so that the institution server 140 is able to discern the corresponding user.

In step 225, unique information is extracted from the user machine 105 to establish the second factor of identification. As previously set forth herein, the information associated with the user machine 105 may include different types of information, such as information related to the IMEI, the IMSI, the geolocation of the machine, machine level attributes, system level attributes, or system pattern extraction. Intially, the security agent 110 encrypts a predefined handshake (or signature) with the session key and then sends the encrypted data to the authentication server 125. The handshake (or signature) informs the authentication server 125 that this is the first session for the user in relation to the second factor of identification. The authentication server 125 then selects one or more "binaries" for the machine parameters (i.e., unique user machine information) to be collected. Generally, a executable binary is an executable file that is meant to be interpreted as a program by a computer. In one embodiment, all the parameters are collected at one time. In another embodiment, the parameters are systematically collected over a predefined number of sessions in a sweep process. In this latter embodiment, the authentication server 125 may collect a first subset of parameters in the first session. In the next login session, the authentication server 125 may use a subset of the collected parameters to establish the second factor of identification and then collect some of the remaining parameters. In the following login, the authentication server 125 may use a subset of the collected parameters to establish the second factor of identification and then collect some additional remaining parameters. The sweep process would continue in a similar manner until all the parameters are collected by the authentication server 125.

After the authentication server 125 selects the executable binaries for the parameters to be collected, the authentication server 125 generates a session concatenation order and session word pad (e.g., one time pad). Generally, a session word pad is an encryption algorithm that is configured such that the plaintext is combined with a random key or "pad" that is as long as the plaintext and is used only once. Next, the authentication server 125 encrypts the session word pad, the session concatenation order, and the selected executable binaries with the session key and then sends the encrypted payload to the security agent 110. It is important to note that the executable binary for the collection of the parameters is not determined or generated by the security agent 110, but rather the authentication server 125 determines which parameters are to be collected, generates the executable binary, and then transmits the executable binary to the security agent 110 for execution.

After the security agent 110 receives the encrypted payload from the authentication server 125, the security agent 110 decrypts the payload and loads the payload in a predefined memory space in the user machine 105. The predefined memory space is a hole in the memory that was intentionally left when the security agent 110 was created for the placement of the payload from the authentication server 125. The hole in the memory may be configured as a secure place for the executable binary which may prevent other rogue programs from accessing the payload. The security agent 110 then executes the executable binaries in the order they were sent. Next, the security agent 110 concatenates the results of the executable binaries (i.e., unique user machine information) in the order provided by the session concatenation order. Thereafter, the security agent 110 performs a logical operaton of the results utilizing the session word pad. The security agent 110 then encrypts the results and sends the encrypted payload to the authentication server 125. The authentication server 125 uses the session key to decrypt the payload. Next, the authentication server 125 performs a logical operation on the results to extract the parameters. After the unique information is extracted from the user machine 105, the security agent 110 writes random data over the memory space to substanially prevent an outside user from determining the specifics of the parameter executable binaries.

In step 230, the authentication server 125 stores the parameters (i.e., unique user machine 105 information) and the unique user information in the user profiles database for use in later transactions.

Authentication Process

Figure 3:
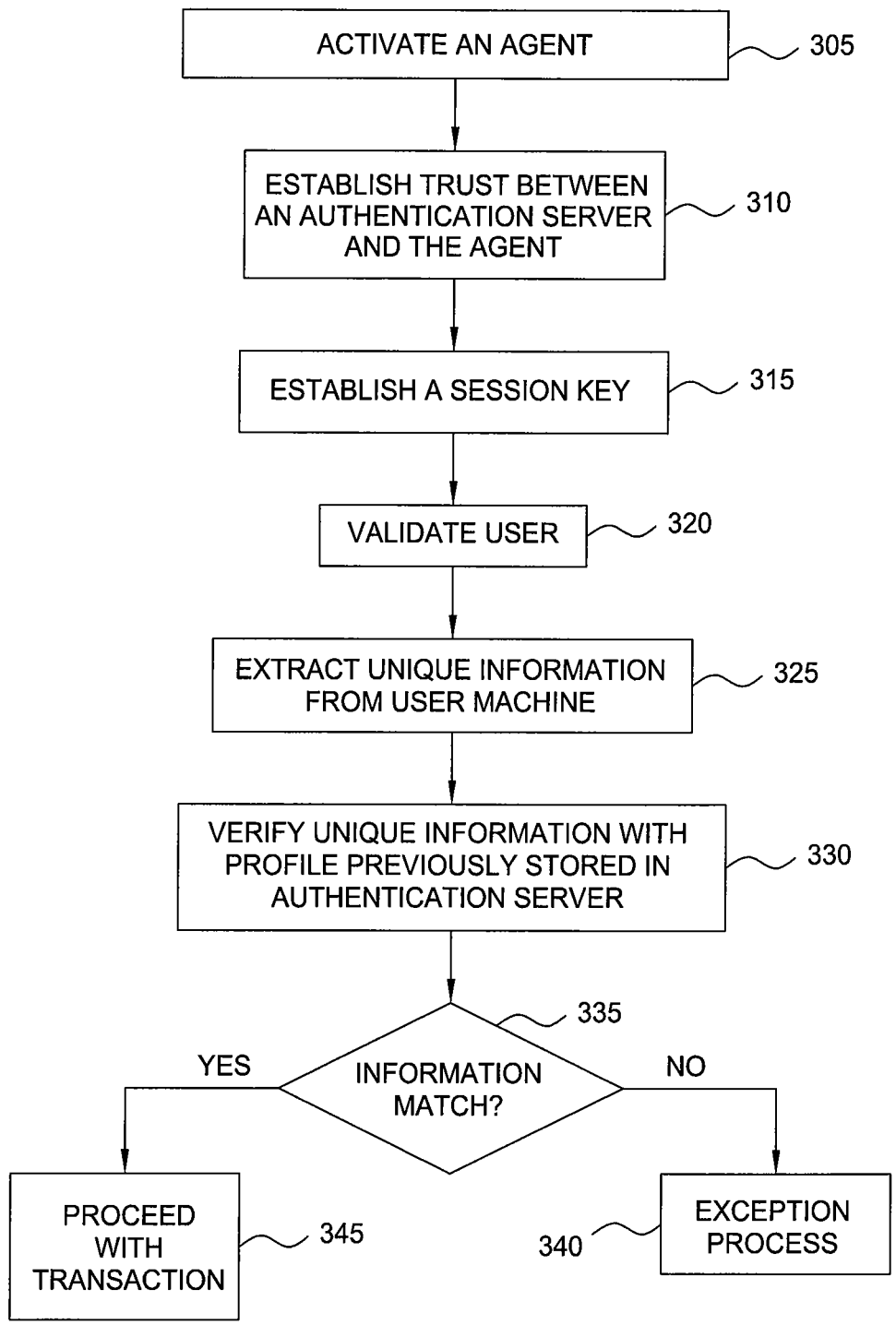
FIG. 3 is a flow chart of method steps for an authentication process in an on-line access transaction, according to one embodiment of the invention.

FIG. 3 is a flow chart of method steps for an authentication process 300 in an on-line access transaction, according to one embodiment of the invention. Although the method steps are described in the context of the system illustrated in FIG. 1, any system configured to perform the method steps in any order is within the scope of the invention. Generally, the authentication process 300 is a process that ensures that the user is properly identified and authenticated prior to the user finalizing the purchase of the product or the service from the on-line merchant, or accessing financial information at a financial institution or any other authentication process.

The authentication process 300 begins with the activation of the security agent 110 for use during the on-line access transaction in step 305. In one embodiment, the security agent 110 automatically activates after the security agent 110 detects a webpage relating to the on-line access transaction. For instance, the security agent 110 may detect an on-line merchant payment webpage by reading the source code of the webpage, such as the HTML code for credit card information, e.g. card type, expiry date, CVV2 code, etc., or by reading a trigger, such as a header or an identification number embedded in the webpage. In another embodiment, the user activates the security agent 110 to perform the on-line access transaction. For instance, the user may select a button on the webpage to activate the security agent 110. In a further embodiment, the on-line merchant or on-line service provider activates the security agent 110 and requires the user to use the security agent 110 during the online access transaction.

In step 310, the security agent 110 establishes a trust with the authentication server 125 in order to validate that the security agent 110 is connecting to the authentication server 125 rather than a rogue server. Again, in this step, the security agent 110 opens a connection to the authentication server 125 and sends a nonce to the authentication server 125. Thereafter, the authentication server 125 digitally signs the nonce with a private key and sends the signed nonce and a public key certificate chain to the security agent 110. Subsequently, the security agent 110 verifies the certificate chain and the signed nonce. In this manner, a trust is established between the security agent 110 and the authentication server 125.

In step 315, a session key is created to ensure that the data transmitted between the security agent 110 and the authentication server 125 is encrypted. As previously described herein, the security agent 110 initiates an agreement with the authentication server 125 to create the session key. Thereafter, the authentication server 125 produces a public key agreement and then returns the agreement to the security agent 110. Subsequently, as previously setforth herein, the key agreement protocol produces the session key comprising a public key and a private key, which may be referred to as asymmetric cryptography. The public key may be distributed, while the private key is kept secret. The data transmitted between the security agent 110 and the authentication server 125 is encrypted with the public key and can only be decrypted with the corresponding private key. In another embodiment, symmetric cryptography may be used to create a session key from a single secret key that is used for both encryption and decryption. Although the session key is described herein as being created by asymmetric cryptography or symmetric cryptography, any form of cryptography may be used to create the session key without departing from principles of the present invention.

As before, in step 320, the user is validated in order to establish the first factor of identification. In this step, the security agent 110 prompts the user to enter a username and password. In one embodiment, the security agent 110 encrypts the username and password with the session key and sends the encrypted data to the authentication server 125. Thereafter, the authentication server 125 decrypts the data to extract the username and password. The athentication server 125 then establishes a session with the instuition server 140 and passes the username and password to the institution server 140 for authentication. In another embodiment, the security agent 110 establishes a session with the institution server 140 and passes the username and password to the institution server 140 for authentication. In either embodiment, it should be noted that the authentication process on the institution server 140 validates the user and thus establishes the first factor of identification. If the institution server 140 is unable to validate the user, then a message is displayed on the security agent 110 prompting the user to press a "Forgot Username/Password" button. After the button is pressed, the user is directed to the institution's password reset page. If the institution sever authenticates the user, then the institution server 140 sends to the authentication server 125 an "authentication pass" message with unique user information that uniquely identifies the user. The unique user information may be a username, an identity number generated by the institution server, a personal account number, a last name, or any other type of information that uniquely identifies the user. As previously set forth herein, the unique user information is a reference number for use in future transactions between the authentication server 125 and the institution server 140 so that the institution server 140 is able to discern the corresponding user.

In step 325, unique information is extracted from the user machine 105 to establish the second factor of identification. As previously set forth herein, the information associated with the user machine 105 may include different types of information, such as information related to the IMEI, the IMSI, the geolocation, machine level attributes, system level attributes, or system pattern extraction. The authentication server 125 then selects the executable binaries for the parameters (i.e., unique user machine information) to be collected. The same parameters may be collected everytime or the parameters may be collected randomly or systematically. After the authentication server 125 selects the executable binaries for the parameters (i.e., unique user machine information) to be collected, the authentication server 125 generates a session concatenation order and a session word pad (e.g., one time pad). Next, the authentication server 125 encrypts the session word pad, the session concatenation order, and the selected executable binaries with the session key and then sends the encrypted payload to the security agent 110. As previously set forth, the executable binary for the collection of the parameters is not determined or generated by the security agent 110, but rather the authentication server 125 determines which parameters are to be collected, generates the executable binary, and then transmits the executable binary to the security agent 110 to be executed. In other words, the security agent 110 is merely a tool for collecting the parameters previously determined by the authentication server 125.

After the security agent 110 receives the encrypted payload from the authentication server 125, the security agent 110 decrypts the payload and loads the payload in a predefined memory space in the user machine 105. The predefined memory space is a hole in the memory that was intentionally left when the security agent 110 was created for the placement of the payload from the authentication server 125. The hole in the memory may be configured as a secure place for the executable binary which may prevent other rogue programs from accessing the payload. The security agent 110 then executes the executable binaries in the order they were sent. Next, the security agent 110 concatenates the results of the executable binaries (i.e., unique user machine information) in the order provided by the session concatenation order. Thereafter, the security agent 110 performs a logical operaton on the results utilizing the session word pad. The security agent 110 then encrypts the results and sends the encrypted payload to the authentication server 125. The authentication server 125 uses the session key to decrypt the payload. Next, the authentication server 125 performs a logical operation on the results to extract the parameters. After the unique information is extracted from the user machine 105, the security agent 110 writes random data over the memory space to substantially prevent an outside user from determining the specifics of the parameter executable binaries. In one embodiment, the security agent 110 is configured to wait for a predetermined amount of time for the executable binaries to complete execution. If the executable binaries are not executed within the predetermined amount of time, then the security agent 110 writes random data over the memory space and the operation is aborted. In another embodiment, the authentication server 125 is configured to wait for a predetermined amount of time for security agent 110 to return the parameters. If the security agent 110 does not return the parameters within the predetermined amount of time, then the opeation is aborted.

In one embodiment, randomly selected different transformations are used to manipulate the parameters collected from the user machine 105. In this emodiment, an algorithm is used to mathamatically to manipulate the parameter during the collection process and then reverse mathamatically manipulate the same parameter to obtain the original parameter. For instance, a checksum (i.e., parameter) may be multiplied by three during the collection process and then divided by three by the algorithm on the authentication server 125 such that the actual checksum is the parameter stored by the authentication server 125.

In another embodiment, a device state in a machine may be used to monitor the use of the user machine 105 and provide early intrusion detection. Generally, the device state is a counter on the security agent 110 that is synchronized with a counter on the authentication server 125. At the registration process, each counter is set to a predetermined number, such as zero. Thereafter, subsequent transactions between the security agent 110 and the authentication server 125 updates the device state by incrementing the counter a predetermined number, such as the number one. If a rogue security agent interacts with the authentication server 125, then the counter on the authentication server 125 will increment, but the counter on the real security agent 110 will not increment. In the next transaction between the security agent 110 and the authentication server 125, there will be a mismatch in the counters (i.e., device state), thereby indicating malicious activity.

In a further embodiment, the authentication server 125 may monitor the velocity of the security agent 110 on the user machine 105. Generally, velocity relates to the amount of transactions conducted by a specific machine. A high velocity may indicate malicious activity. In this embodiment, the authentication server 125 may be configured to monitor the velocity of the security agent 110 in order to detect for malicious activity.

In step 330, the authentication server 125 compares the extracted parameters with the parameters previously stored in the user profiles database during the registration process and subsequent transactions. If the extracted parameters do not match the parameters previously stored in the user profiles database, then in step 340 an exception process is activated. Depending on the type of mismatch, the exception process in step 340 may include limited transaction capabilities or the exception process may require the collection of additional data or that the user go through the registration process 200 again. For instance, if there is small mismatch, such as a wrong geolocation due to the user traveling or a different hard drive serial number due the user upgrading the user machine 105, then the user may still be allowed to proceed with the transaction after collecting additional data. If there is a large mismatch, then the user may be required to go through the registration process 200 again in order to establish the identity of the user machine 105 and the factors of authentication. The exception process in step 340 will be institution dependent. In other words, each institution will have different exception levels based upon the proceedures setup by the institution. If the parameters collected in step 325 do match the parameters in the user profiles database 130, then the user is allowed to proceed with the transaction in step 345.

While the foregoing is directed to embodiments of the present invention, other and further embodiments of the invention may be devised without departing from the basic scope thereof, and the scope thereof is determined by the claims that follow.

The invention claimed is:

1. A method for identifying and authenticating a user, the method comprising:
    establishing a trust between a server machine and a security agent on a user machine;
    establishing a session key to encrypt communications between the server machine and the security agent;
    receiving a username and password for use in validating the user;
    determining device data that is to be extracted from the user machine by the security agent;
    creating an executable binary that is configured to be executed by the security agent in order to extract the device data from the user machine;
    generating a session concatenation order that defines how the device data extracted from the user machine should be concatenated by the security agent;
    transmitting the executable binary and the session concatenation order to the security agent for execution, wherein the executable binary and the session concatenation order are to be stored in a protected area of a memory included in the user machine; and
    receiving the device data extracted from the user machine from the security agent, wherein the extracted device data is concatenated according to the session concatenation order.

2. The method of claim 1, further comprising the steps of establishing a communication link with an institution server and transmitting the username and password to the institution server for validation of the user.

3. The method of claim 2, further comprising the step of receiving unique user information from the institution server upon validation of the user.

4. The method of claim 3, further comprising the step of storing the unique user information and the device data in a user profile database.

5. The method of claim 1, further comprising the step of combining the extracted device data with a session wordpad.

6. The method of claim 5, further comprising the step performing a logical operation of the results utilizing the session wordpad.

7. The method of claim 1, further comprising the steps of encrypting the executable binary with the session key and transmitting the executable binary to the security agent for execution.

8. The method of claim 7, wherein the security agent is configured to wait a predetermined time for the executable binary to execute and then erase the executable binary from a memory space on the user machine.

9. The method of claim 1, further comprising the steps of using the session key to encrypt the device data extracted from the user machine by the execution of the executable binary and transmitting the encrypted device data to the server machine.

10. The method of claim 9, further comprising the steps of receiving the encrypted device data, decrypting the extracted device data using the session key, and storing the extracted device data in a user profiles database on the server machine.

11. The method of claim 1, further comprising the step of comparing the extracted device data to data stored in a user profiles database.

12. The method of claim 11, further comprising the step of allowing the user to proceed with a transaction as a result of a match in the comparison of data.

13. The method of claim 11, further comprising the step of activating an exception process as a result of a mismatch in the comparison of data.

14. The method of claim 1, wherein the extracted device data is manipulated with randomly selected different transformations.

15. The method of claim 1, wherein a N number of random device data is extracted at a first instance and a random subset of the N number and an additional random M number of device data is extracted at a second instance until all the device data is extracted.

16. The method of claim 1, wherein the security agent includes a keypad for inputting the username and password.

17. The method of claim 16, wherein at least one parameter of the keypad is randomly changed.

18. The method of claim 17, wherein the at least one parameter is the coordinates of the keypad.

19. The method of claim 1, further comprising the step of monitoring a device state in the server machine and the security agent.

20. The method of claim 1, wherein the security agent includes an instruction to create the protected area in the memory during installation of the security agent on the user machine.

21. The method of claim 20, further comprising supplying the security agent to the user machine.

22. A non-transitory computer-readable medium including a set of instructions that when executed by a processor cause the processor to identify and authenticate the user by performing the steps of:
    establishing a trust between a server machine and a security agent on a user machine;
    establishing a session key to encrypt communications between the server machine and the security agent;
    receiving a username and password for use in validating the user;
    determining device data that is to be extracted from the user machine by the security agent;
    creating an executable binary that is configured to be executed by the security agent in order to extract the device data from the user machine;
    generating a session concatenation order that defines how the device data extracted from the user machine should be concatenated by the security agent;
    transmitting the executable binary and the session concatenation order to the security agent for execution, wherein the executable binary and the session concatenation order are to be stored in a protected area of a memory included in the user machine; and
    receiving the device data extracted from the user machine from the security agent, wherein the extracted device data is concatenated according to the session concatenation order.

23. The non-transitory computer-readable medium of claim 22, further comprising the step of combining the extracted device data with a session wordpad.

24. The non-transitory computer-readable medium of claim 23, further comprising the step of performing a logical operation of the results utilizing the session wordpad.

25. The non-transitory computer-readable medium of claim 22, further comprising the steps of encrypting the executable binary with the session key and transmitting the executable binary to the security agent for execution.

26. The non-transitory computer-readable medium of claim 22, wherein the security agent uses the session key to encrypt the device data extracted from the user machine by the execution of the executable binary and transmits the encrypted device data to the server machine.

27. The non-transitory computer-readable medium of claim 26, further comprising the steps of receiving the encrypted device data, decrypting the extracted device data using the session key and storing the extracted device data in a user profiles database on the server machine.

28. The non-transitory computer-readable medium of claim 22, further comprising the steps of establishing a communication link with an institution server and transmitting the username and password to the institution server for validation of the user.

29. The non-transitory computer-readable medium of claim 28, further comprising the step of receiving unique user information from the institution server upon validation of the user.

30. A system for identifying and authenticating a user, the system comprising:
  a server machine having a first processor and a first memory, wherein the first memory includes a program configured to:
    establish a trust between the server machine and a security agent on a computing device;
    establish a session key with the security agent to encrypt communication between the server machine and the security agent;
    receive a username and password for use in validating the user;
    determine device data of the computing device that is to be extracted by the security agent;
    create an executable binary that is configured to be executed by the security agent in order to extract the device data from the computing device;
    generate a session concatenation order that defines how the device data extracted from the computing device should be concatenated by the security agent;
    transmit the executable binary and the session concatenation order to the security agent for execution, wherein the executable binary and the session concatenation order are to be stored in a protected area of a memory included in the computing device; and
    receive the device data extracted from the security agent, wherein the extracted device data is concatenated according to the session concatenation order.

31. The system of claim 30, wherein the server machine is configured to encrypt the executable binary with the session key.

32. The system of claim 30, wherein the computing device is configured to use the session key to encrypt the device data extracted from the user machine by the execution of the executable binary and transmit the encrypted device data to the server machine.

33. The system of claim 32, wherein the server machine is configured to receive the encrypted device data, decrypt the extracted device data using the session key, and store the extracted device data in a user profiles database on the server machine.

34. The system of claim 30, wherein the computing device is configured to wait a predetermined time for the executable binary to execute and then erase the executable binary from a memory space on the computing device.

35. The system of claim 30, wherein the server machine is configured to combine the extracted device data with a session wordpad.

36. The system of claim 35, wherein the computing device is configured to perform a logical operation of the results utilizing the session wordpad.

* * * * *